United States Patent
Genkin et al.

(10) Patent No.: US 9,631,258 B2
(45) Date of Patent: Apr. 25, 2017

(54) METHODS FOR EXTRACTING RARE-EARTH METALS AND PREPARING GYPSUM PLASTER FROM PHOSPHOGYPSUM HEMIHYDRATE

(71) Applicant: OPENED JOINT STOCK COMPANY "UNITED CHEMICAL COMPANY URALCHEM", Moscow (RU)

(72) Inventors: Mikhail Vladimirovich Genkin, Moscow (RU); Aleksey Vladimirovich Evtushenko, Moscow (RU); Aleksey Aleksandrovich Komkov, Moscow (RU); Alfiya Minerovna Safiulina, Moscow (RU); Vasiliy Sergeevich Spiridonov, Moscow (RU); Sergey Vladimirovich Shvetsov, Nizhegorodskaya oblast (RU)

(73) Assignee: OPENED JOINT STOCK COMPANY "UNITED CHEMICAL COMPANY URALCHEM", Moscow (RU)

( * ) Notice: Subject to any disclaimer, the term of this patent is extended or adjusted under 35 U.S.C. 154(b) by 0 days.

(21) Appl. No.: 14/773,725

(22) PCT Filed: Nov. 8, 2013

(86) PCT No.: PCT/RU2013/000991
§ 371 (c)(1),
(2) Date: Sep. 8, 2015

(87) PCT Pub. No.: WO2014/137239
PCT Pub. Date: Sep. 12, 2014

(65) Prior Publication Data
US 2016/0040268 A1 Feb. 11, 2016

(30) Foreign Application Priority Data
Mar. 5, 2013 (RU) .................. 2013109739

(51) Int. Cl.
 *C22B 59/00* (2006.01)
 *C22B 3/10* (2006.01)
 *C22B 3/06* (2006.01)

(52) U.S. Cl.
 CPC ............ *C22B 59/00* (2013.01); *C22B 3/06* (2013.01); *C22B 3/10* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 2,783,125 A | 2/1957 | De Rohden et al. | |
| 4,169,880 A | 10/1979 | Cuer et al. | |
| 5,030,424 A | 7/1991 | Fulford et al. | |

FOREIGN PATENT DOCUMENTS

| | | | |
|---|---|---|---|
| CN | 101597688 A1 | * | 12/2009 |
| CN | 101823750 A | * | 9/2010 |
| EP | 0026132 A1 | | 4/1981 |
| EP | 0026132 B1 | | 8/1983 |
| EP | 0265547 A1 | | 5/1988 |
| EP | 0255534 A1 | | 1/1993 |
| EP | 0522234 A1 | | 1/1993 |
| KZ | 24267 A4 | | 7/2011 |
| PL | 155815 | | 6/1993 |
| RU | 2047562 C1 | | 11/1995 |
| RU | 2118613 C1 | | 9/1998 |
| RU | 2172719 C1 | | 8/2001 |
| RU | 2225892 C1 | | 3/2004 |
| RU | 2288171 C1 | | 11/2006 |
| RU | 2293781 C1 | | 2/2007 |
| RU | 2293134 C1 | | 10/2007 |
| RU | 2349652 C2 | | 3/2009 |
| RU | 2374260 C1 | | 11/2009 |
| RU | 2471011 C1 | | 12/2012 |
| RU | 2528573 C1 | | 9/2014 |
| RU | 2528576 C1 | | 9/2014 |
| RU | 2538863 C2 | | 1/2015 |
| RU | 2543160 C2 | | 2/2015 |

(Continued)

OTHER PUBLICATIONS

Koopman et al., Extraction of Lathanides from the Phosphoric Acid Production Process to gain a purified gypsum and a valuable lanthanide by-product. (Jun. 2000).*
International search report and written opinion of the international searching authority for co-pending PCT application No. PCT/RU2013/000991 mailed Apr. 10, 2014.
Decision to Grant a Patent for Invention mailed Feb. 25, 2014 for RU Application No. 2013109739/02 filed Mar. 5, 2013, now RU Patent No. 2528573 C1.
International Search Report and Written Opinion of the International Searching Authority for co-pending PCT application No. PCT/RU2013/000988 mailed Mar. 13, 2014.

(Continued)

*Primary Examiner* — Melissa Swain
(74) *Attorney, Agent, or Firm* — Baker & McKenzie LLP

(57) ABSTRACT

The present invention relates to a method for complex processing of apatite concentrate resulting in producing concentrate of rare earth metals (REM) and plaster from phosphogypsum, a waste of sulphuric acid technology for producing phosphoric acid from apatite. The method comprises recrystallization of hemihydrate or anhydrite of calcium sulphate into dihydrate of calcium sulphate in the presence of a soluble calcium salt at concentrations of 0.075-3.75 M (in terms of $Ca^{2+}$) at subacidic conditions (pH>1), and dissolution with strong acid (pKa<0) at a concentration of 0.2-8.0 M (in terms of $H^+$). Recovery of REM into solution is up to 95%, the residual content of impurities of phosphorus, fluorine and alkali metals in dihydrate of calcium sulphate does not exceed 0.3 wt. %, 0.1 wt. %, 0.05 wt. %, respectively.

10 Claims, No Drawings

(56) References Cited

FOREIGN PATENT DOCUMENTS

| RU | 2546739 C2 | 4/2015 |
|---|---|---|
| SU | 862819 A1 | 9/1981 |
| SU | 950684 A1 | 8/1982 |
| SU | 1370076 A1 | 1/1988 |
| WO | 2006058508 A1 | 6/2006 |

OTHER PUBLICATIONS

International Search Report and Written Opinion of the International Searching Authority for co-pending PCT application No. PCT/RU2013/000989 mailed Apr. 3, 2014.
International Search Report and Written Opinion of the International Searching Authority for co-pending PCT application No. PCT/RU2013/000992 mailed Apr. 10, 2014.
International Search Report and Written Opinion of the International Searching Authority for co-pending PCT application No. PCT/RU2013/000990 mailed May 15, 2014.

* cited by examiner

US 9,631,258 B2

METHODS FOR EXTRACTING RARE-EARTH METALS AND PREPARING GYPSUM PLASTER FROM PHOSPHOGYPSUM HEMIHYDRATE

CROSS REFERENCE TO RELATED APPLICATIONS

This patent application is a national phase filing under section 371 of PCT/RU2013/000991, filed Nov. 8, 2013, which claims the priority of Russian patent application 2013109739, filed Mar. 5, 2013, each of which is incorporated herein by reference in its entirety.

FIELD OF THE INVENTION

The present invention relates to technologies for complex processing of apatite, in particular, technologies for obtaining a concentrate of rare-earth metals (REM) and gypsum plaster from phosphogypsum, a waste of sulphuric acid technology for producing phosphoric acid from apatite.

BACKGROUND OF THE INVENTION

Tens of millions of tons of phosphorus-containing minerals, such as apatite, rock phosphate, etc., are processed for producing phosphorus-containing fertilizers. Typically, the processing is carried out by treating these natural materials with concentrated nitric or sulphuric acid. During the treatment with sulphuric acid, apatite is decomposed with precipitation of calcium sulphate and formation of phosphoric acid solution. In this case, the main waste product is phosphogypsum (calcium sulphate contaminated with impurities of $P_2O_5$, F, Fe, Al, Sr, REM) which comprises most of the rare-earth metals contained in apatite. For example, apatite of the Kola Peninsula contains up to 1% of rare-earth metals, the 70 to 100% of which are precipitated with calcium sulphate at apatite processing with sulphuric acid. Phosphogypsum constitutes whole mountains around the plants for processing of apatite. Every year millions of tons of phosphogypsum containing about 0.5% REM in terms of oxides, which currently can not be extracted from it, are sent to dumps. Furthermore, the presence of such dumps containing toxic compounds including fluorine is an environmental problem. In this regard, numerous research projects have been conducted to develop processing technology to extract REM and remove toxic components.

A method for extracting rare-earth elements from phosphogypsum by treatment with nitric acid and subsequent extraction of rare earth elements (REE) by phosphine oxide is described in Martynova I. N. et al. Research of distribution of REE in the course of extraction from acidic nitrate-phosphate solutions. Collected articles "Processing and physico-chemical properties of compounds of rare elements. Apatity, 1984, pp. 6-8 (Rus). The disadvantage of this method is the need for expensive trialkyl phosphine oxide and the impossibility of complete liquid-phase removal of REE from the organic phase. Furthermore, because of the high loss of trialkyl phosphine oxide with the aqueous phase, this method is uneconomical and requires additional facilities for trialkyl phosphine oxide utilization.

Nitric acid extraction technology for isolation of rare earth elements from apatite, giving up to 85% release in a solution also containing phosphorus and fluorine is described in (Kosynkin V. D. et al. "Condition and perspective of rare earth industry in Russia", "Metals" (rus), No. 1, 2001). The disadvantage of this method is the impossibility of using process solutions in a closed loop and the subsequent low recovery of REM in the process in closed loop.

A method for extracting rare earth elements from phosphogypsum is described in PCT publication WO2011008137. The method involves the acid extraction of rare earth element compounds from phosphogypsum using a solution consisting of a mixture of sulphuric acid and nitric acid in a ratio of 3.2:1.2 with a concentration of 1-3 wt. % and a liquid to solid ratio of 4:5 over a period of 8-12 minutes, while the extraction suspension is agitated and subjected to a hydroacoustic effect. The insoluble gypsum residue is then separated from the extraction suspension and the rare earth element compounds are recovered from the extraction solution by cation exchange sorption with the extraction solution being passed through a cation exchange filter. The main disadvantages of this method are not sufficiently high enough degree of extraction of rare earth metals (up to 85%) with the high cost ion exchanger, long duration of the process and large material flows.

A method of recovering rare-earth elements from phosphogypsum disclosed in RU patent No. 2293781. The method comprises treatment of phosphogypsum with sulphuric acid solution to recover rare-earth elements into solution, separation of gypsum precipitate, increasing of oversaturation rate of the solution in terms of rare-earth elements to crystalize rare-earth metal concentrate, and separation of the concentrate from mother liquor followed by concentrate processing. Phosphogypsum is treated with 22-30% sulphuric acid solution at liquids-to-solids ratio 1.8-2.2 during 20-30 min to prevent spontaneous crystallization of rare-earth element concentrate in solution before insoluble precipitate is separated. An increase of the oversaturation rate of the solution is achieved by means of providing sodium concentration 0.4-1.2 g/L. The disadvantage of this method is the use of additional reagents, high acid concentrations and significant amounts thereof, a large number of basic technological operations with incomplete extraction of rare earth elements (up to 71.4%) and the overall complexity of the process.

SUMMARY

Embodiments of the present disclosure may provide for methods for extracting rare earth metals (REM) from phosphogypsum. Methods may comprise successive steps of recrystallization of phosphogypsum and dissolution of REM. Recrystallization of hemihydrate or anhydrite of calcium sulphate into dihydrate of calcium sulphate may be carried out in the presence of soluble calcium salt at concentrations of 0.075 M to 3.75 M (in terms of $Ca^{2+}$) at subacidic conditions (pH>1). Dissolution may be carried out with strong acid ($pK_a<0$) at concentrations of 0.2 M to 8.0 M (in terms of $H^+$).

In some embodiments, the calcium nitrate or calcium chloride, or a mixture thereof may be used as the calcium salt. Nitric acid or hydrochloric acid or sulphuric acid or a mixture thereof may be used as the acid. In some embodiments, recrystallization may be carried out at 10° C. to 50° C. during 0.25 hours to 4.0 hours. In some embodiments, recrystallization may be carried out at 20° C. to 30° C. during 2.0 to 3.0 hours.

DETAILED DESCRIPTION

The present invention addresses the problem of highly efficient extraction of REM from phosphogypsum followed by obtaining REM concentrate, and simultaneous purification of calcium sulphate from phosphorus and fluorine impurities. In the present invention, the term "REM" is used to indicate lanthanides and yttrium. Also, the symbol "Ln" is used for these elements.

Embodiments of the present disclosure may advantageously address the aforementioned problems. The first step of the method comprises recrystallization of phosphogypsum from hemihydrate $CaSO_4*0.5H_2O$ or anhydride $CaSO_4$ into dihydrate $CaSO_4*2H_2O$ in neutral or subacidic solution of calcium salts, at the same time REM are extracted from solid solution of calcium sulphate into separate solid phase. At the second step of the method, compounds of REM, fluorine, phosphorus and alkali metals are dissolved with an acid. Yield of REM extraction is 88-95%, the residual content of phosphorus, fluorine and alkali metals in calcium sulphate dihydrate is no more than 0.3 wt. %, 0.1 wt. %, 0.05 wt. %, respectively. Isolation of REM concentrate from the aqueous solution can be effected by any suitable method described in the literature.

The essence of the present invention is set forth in details below.

According to embodiments of the present disclosure, a significant part of REM in the phosphogypsum hemihydrate is present in the form of compounds $MLn(SO_4)_2$ (wherein M—alkali metal atom, Na or K), forming a solid solution with the main phase of calcium sulphate. Thus, treatment of calcium sulphate which is not accompanied by changes in the crystal structure thereof will not provide a high degree of extraction of rare earth metals in the solution. That is, the best extraction of rare-earth metals is achieved by recrystallization of calcium sulphate hemihydrate $CaSO_4*0.5H_2O$ or anhydride $CaSO_4$ into dihydrate $CaSO_4*2H_2O$. It is shown for dihydrate $CaSO_4*2H_2O$ that REM form separate phases in the form of sulphates, while REM are not present in detectable amounts in crystals of $CaSO_4*2H_2O$ available (Bushuev N. N., Nabiev A. G., Petropavlovskiy I. A., Smirnov I. C. "The nature of inclusion of REE cerium subgroup in the structure of calcium sulphate crystalline hydrates", Journal of Applied Chemistry (rus), 1988, No. 10, V. 61, pp. 2153-2158; Bobik V. M. Coprecipitation of rare earth elements in a system of three heterovalent ions with sulphates of alkali and alkaline earth elements. Radiochemistry (rus), 1977, No. 5, pp. 606-610).

Thus, behaviour of REM in the course of recrystallization of phosphogypsum hemihydrate can be described by the following equation:

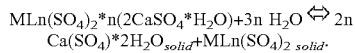

The presence of calcium salts in the solution promotes extraction of REM from solid solution of calcium sulphate and precipitation thereof in form of separate solid phase. Therefore, recrystallization is preferably carried out in the presence of readily soluble calcium salts: $Ca(NO_3)_2$, $CaX_2$ (where X is Cl, Br, I), $Ca(ClO_4)_2$, $CaSiF_6$ etc. The concentration of calcium salt is selected to allow: a) proceeding recrystallization of phosphogypsum (increasing calcium concentration makes dihydrate formation thermodynamically less favorable); and b) full recovering of the rare earth metals (as it is shown in the Examples below, increasing calcium concentration increases recovery rate). Use of $CaCl_2$ and $Ca(NO_3)_2$ at concentration of 10-300 g/L and 10-500 g/L, respectively, is especially preferred (0.075-3.75 M in terms of $Ca^{2+}$). The upper limit is determined by item "a" (the possibility of occurrence of recrystallization of hemihydrate), the bottom limit is determined by item "b" (the desired degree of REM extraction from the solid solution).

The duration and temperature of the process is determined by the same demands, such as the possibility of occurrence of recrystallization of hemihydrate into dihydrate and the completeness of recrystallization. The process is preferably carried out at 10-45° C. for 0.5-4.0 hours, most preferably 13 at 20-30° C. for 1-2 hours.

Conversion of hemihydrate into dihydrate and anhydride into dihydrate is thermodynamically possible. However, due to the high stability of the calcium sulphate anhydride, conversion of anhydride into dihydrate takes too much time (under normal conditions the detectable conversion occurs within a few weeks). Conversion of hemihydrate into dihydrate is more preferable, since it occurs quickly.

REM can be precipitated from neutral or subacidic solutions in form of separate phases, such as $MLn(SO_4)_2$, $LnPO_4*nH_2O$, $LnF_3*nH_2O$, $M_xLn_y(PO_4)*nH_2O$ etc. Thus, on the second step of the method of the present invention, REM along with calcium phosphates and calcium fluoride is dissolved by strong acid. The term "strong acid" includes HX (where X is Cl, Br, I), $HNO_3$, $H_2SO_4$ etc.

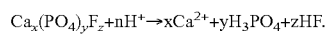

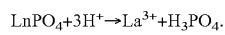

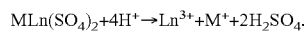

The concentration of acid is selected to allow complete dissolution of REM along with phosphorus, fluoride, alkali metal impurities (as it is shown in the Examples below, increase of acid concentration increases recovery rate). Use of HCl and $HNO_3$ at concentration of 5-250 g/L and 5-300 g/L, respectively, (0.2-8 M in terms of $H^+$) is especially preferred.

If all the above conditions are fulfilled, the degree of extraction of REM in the solution is up to 95%, a residual content of phosphorus, fluorine and alkali metal impurities in calcium sulphate dihydrate does not exceed 0.3 wt. %, 0.1 wt. %, and 0.05 wt. %, respectively.

Isolation of REM concentrate from an aqueous solution is described in the literature (e.g. Chemistry and technology of rare and trace elements. Part 2. Ed. Bolshakov K. A., Moscow, High School, 1976, p. 360 (rus)) and is not the subject of the present invention. As an example, the process comprising precipitation of REM from sulphuric acid solution with sodium sulphate (RU patent 2293781) or the process comprising acid neutralization followed by precipitation of REM in form of phosphate-fluorine salt (RU patent 2109686) can be used.

Thus, the overall recovery of REM from phosphogypsum into the concentrate according to the present invention is up to 95%.

The present invention is explained in more detail below using exemplary embodiments, serving solely for illustrative purposes and not intended to limit the scope of the present invention defined by the appended claims.

Examples 1-3

Recrystallization $CaSO_4*0.5H_2O+1.5H_2O \rightarrow CaSO_4*2H_2O$ was carried out under the following conditions: temperature—20-45° C., total time of crystallization—3 hours, the weight ratio of the solution (L, liquid) and loaded hemihydrate (S, solid), L/S=3/1. Recrystallization was carried out by continuously stirring the suspension.

At the end of the recrystallization process, precipitate of dihydrate of calcium sulphate was filtered and washed out.

Then, resulted precipitate was treated with nitric acid solution for 1 hour at temperature 20-45° C., the weight ratio of the solution (L, liquid) and loaded dihydrate (S, solid), L/S=3/1. The treatment was carried out by continuously stirring the suspension.

Table 1 shows the composition of the initial hemihydrate and the resulting recrystallized dihydrate after acidic treatment.

Examples 4-5

Recrystallization $CaSO_4*0.5H_2O+1.5H_2O \rightarrow CaSO_4*2H_2O$ in y % $CaCl_2$ solutions was carried out under the following conditions: temperature—20-45° C., total time of crystallization—3 hours, the weight ratio of the solution (L, liquid) and loaded hemihydrate (S, solid), L/S=3/1. Recrystallization was carried out by continuously stirring the suspension.

At the end of the recrystallization process, precipitate of dihydrate of calcium sulphate was filtered and washed out.

Then, resulted precipitate was treated with 4% nitric acid solution for 1 hour at temperature 20-45° C., the weight ratio of the solution (L, liquid) and loaded dihydrate (S, solid), L/S=3/1. The treatment was carried out by continuously stirring the suspension.

Table 2 shows the composition of the initial hemihydrate and the resulting recrystallized dihydrate after acidic treatment.

Examples 6-7

Recrystallization $CaSO_4*0.5H_2O+1.5H_2O \rightarrow CaSO_4*2H_2O$ in solutions of nitric and hydrochloric acids without additional salts was carried out under the following conditions: temperature—20-22° C., total time of crystallization—3 hours, the weight ratio of the solution (L, liquid) and loaded hemihydrate (S, solid), L/S=3/1. Recrystallization was carried out by continuously stirring the suspension.

At the end of the recrystallization process, precipitate of dihydrate of calcium sulphate was filtered and washed out.

Table 3 shows the composition of the initial hemihydrate and the resulting recrystallized dihydrate after acidic treatment.

As can be seen from the data in Tables 1-3, recrystallization in the presence of calcium salts yields much higher extraction of REM into solution (up to 95%), then recrystallization without calcium salts (up to 50%).

While the present invention is described in detail above, one skilled in the art will recognize that modifications and equivalent substitutions can be made, and such modifications and substitutions are within the scope of the present invention defined by the appended claims.

TABLE 1

| Example No. | Temperature, ° C. | L/S | The first treatment, $Ca(NO_3)_2$, wt. % (M) | The second treatment, $HNO_3$, wt. % (M) | Solid phase | $H_2O$ total, wt. % | $H_2O$ crystal, wt. % | $P_2O_5$, wt. % | F, wt. % | $Ln_2O_3$ total, wt. % | $Na_2O$, wt. % | $K_2O$, wt. % |
|---|---|---|---|---|---|---|---|---|---|---|---|---|
| 1 | 20-22 | 3/1 | 30% (2.4M) | 4% (0.65M) | Source phosphogypsum | 21.4 | 6.9 | 1.1 | 0.32 | 0.49 | 0.19 | 0.06 |
|   |   |   |   |   | Dihydrate after recrystallization and washing by water | 28.30 | 19.7 | 0.87 | 0.22 | 0.38 | 0.12 | 0.05 |
|   |   |   |   |   | Dihydrate after washing with 4% $HNO_3$ | 29.0 | 20.7 | 0.21 | 0.06 | 0.043 | 0.05 | 0.03 |
| 2 | 20-22 | 3/1 | 10% (0.9M) | 10% (1.67M) | Source phosphogypsum | 21.4 | 6.9 | 1.1 | 0.32 | 0.490 | 0.19 | 0.06 |
|   |   |   |   |   | Dihydrate after recrystallization and washing by water | 29.30 | 20.4 | 0.76 | 0.18 | 0.39 | 0.13 | 0.05 |
|   |   |   |   |   | Dihydrate after washing with 10% $HNO_3$ | 30.1 | 20.9 | 0.15 | 0.04 | 0.083 | 0.06 | 0.03 |
| 3 | 40-45 | 3/1 | 40% (3.7M) | 12% (2.03M) | Source phosphogypsum | 21.4 | 6.9 | 1.1 | 0.32 | 0.490 | 0.19 | 0.06 |
|   |   |   |   |   | Dihydrate after recrystallization and washing by water | 31.10 | 18.6 | 0.96 | 0.28 | 0.45 | 0.16 | 0.06 |
|   |   |   |   |   | Dihydrate after washing with 12% $HNO_3$ | 30.7 | 20.7 | 0.20 | 0.06 | 0.033 | 0.05 | 0.03 |

TABLE 2

| Example No. | Temperature, ° C. | L/S | The first treatment, $CaCl_2$, wt. % (M) | The second treatment, $HNO_3$, wt. (M) | Solid phase | $H_2O$ total, wt. % | $H_2O$ crystal, wt. % | $P_2O_5$, wt. % | F, wt. % | $Ln_2O_3$, total, wt. % | $Na_2O$, wt. % | $K_2O$, wt. % |
|---|---|---|---|---|---|---|---|---|---|---|---|---|
| 4 | 20-22 | 3/1 | 17% (1.76M) | 4% (0.65M) | Source phosphogypsum | 21.4 | 6.9 | 0.93 | 0.27 | 0.59 | 0.15 | 0.09 |
|   |   |   |   |   | Dihydrate after recrystallization and washing by water | 29.5 | 18.8 | 0.67 | 0.15 | 0.38 | 0.11 | 0.06 |

TABLE 2-continued

| Example No. | Temperature, ° C. | L/S | The first treatment, CaCl$_2$, wt. % (M) | The second treatment, HNO$_3$, wt. (M) | Solid phase | H$_2$O total, wt. % | H$_2$O crystal, wt. % | P$_2$O$_5$, wt. % | F, wt. % | Ln$_2$O$_3$, total, wt. % | Na$_2$O, wt. % | K$_2$O, wt. % |
|---|---|---|---|---|---|---|---|---|---|---|---|---|
|  |  |  |  |  | Dihydrate after washing with 4% HNO$_3$ | 29.0 | 20.7 | 0.12 | 0.03 | 0.037 | 0.05 | 0.03 |
| 5 | 20-22 | 3/1 | 10% (0.98M) | 10% (1.67M) | Source phosphogypsum | 21.4 | 6.9 | 0.93 | 0.27 | 0.59 | 0.15 | 0.09 |
|  |  |  |  |  | Dihydrate after recrystallization and washing by water | 34.30 | 19.1 | 0.86 | 0.17 | 0.41 | 0.18 | 0.07 |
|  |  |  |  |  | Dihydrate after washing with 10% HNO$_3$ | 30.9 | 20.8 | 0.18 | 0.04 | 0.053 | 0.06 | 0.03 |

TABLE 3

| Example No. | Temperature, ° C. | L/S | Acid | Acid concentration, wt. % (M) | Solid phase | H$_2$O total, wt. % | H$_2$O crystal, wt. % | P$_2$O$_5$, wt. % | F, wt. % | Ln$_2$O$_3$, total, wt. % | Na$_2$O, wt. % | K$_2$O, wt. % |
|---|---|---|---|---|---|---|---|---|---|---|---|---|
| 6 | 20-22 | 3/1 | HCl | 7% (1.97M) | Source phosphogypsum | 29.7 | 7.0 | 0.85 | 0.31 | 0.38 | 0.14 | 0.11 |
|  |  |  |  |  | Dihydrate after recrystallization and washing by water | 31.5 | 20.2 | 0.03 | 0.02 | 0.18 | 0.05 | 0.03 |
| 7 | 20-22 | 3/1 | HNO$_3$ | 12% (2.03M) | Source phosphogypsum | 29.7 | 7.0 | 0.85 | 0.31 | 0.38 | 0.14 | 0.11 |
|  |  |  |  |  | Dihydrate after recrystallization and washing by water | 33.30 | 20.4 | 0.05 | 0.01 | 0.16 | 0.04 | 0.01 |

What is claimed:

1. A method for extracting rare earth metals from phosphogypsum, the method comprising:
   (a) treating a hemihydrate or anhydrite of calcium sulphate with a soluble calcium salt under subacidic conditions to form a soluble calcium salt treated mixture, the soluble calcium salt treated mixture comprising a first calcium sulphate dihydrate precipitate and a rare earth metal precipitate; and
   (b) treating the soluble calcium salt treated mixture with a strong acid to form a second calcium sulphate dihydrate precipitate and a rare earth metal supernatant,
   wherein the soluble calcium salt has a Ca2+ concentration from 0.075 M to 3.75 M of $Ca^{2+}$,
   wherein the subacidic conditions comprises a pH greater than 1,
   wherein the strong acid has a pKa less than 0, and
   wherein the strong acid has an $H^+$ concentration from 0.2 M to 8.0 M.

2. The method of claim 1, wherein the soluble calcium salt is selected from the group consisting of calcium nitrate, calcium chloride, and a mixture thereof.

3. The method of claim 1, wherein the treating a hemihydrate or anhydrite of calcium sulphate with a soluble calcium salt under subacidic conditions is carried out at 10° C. to 50° C. during 0.25 hours to 4.0 hours.

4. The method of claim 1, wherein the treating a hemihydrate or anhydrite of calcium sulphate with a soluble calcium salt under subacidic conditions is carried out at 20° C. to 30° C.

5. The method of claim 1, wherein the strong acid is selected from the group consisting of nitric acid, hydrochloric acid, sulphuric acid, and a mixture thereof.

6. The method of claim 1, further comprising filtering the second calcium sulphate dihydrate precipitate from the rare earth metal supernatant.

7. The method of claim 6, further comprising concentrating the rare earth metal supernatant to form a rare earth metal concentrate.

8. The method of claim 1, wherein the rare earth metal supernatant comprises lanthanum.

9. The method of claim 1, wherein the rare earth metal supernatant comprises yttrium.

10. The method of claim 1, wherein the rare earth metal supernatant comprises a combination of lanthanum and yttrium.

* * * * *